A. DURESEN.
TWO-WHEELED MOTOR VEHICLE.
APPLICATION FILED JULY 3, 1919.
1,339,554.
Patented May 11, 1920.
3 SHEETS—SHEET 1.
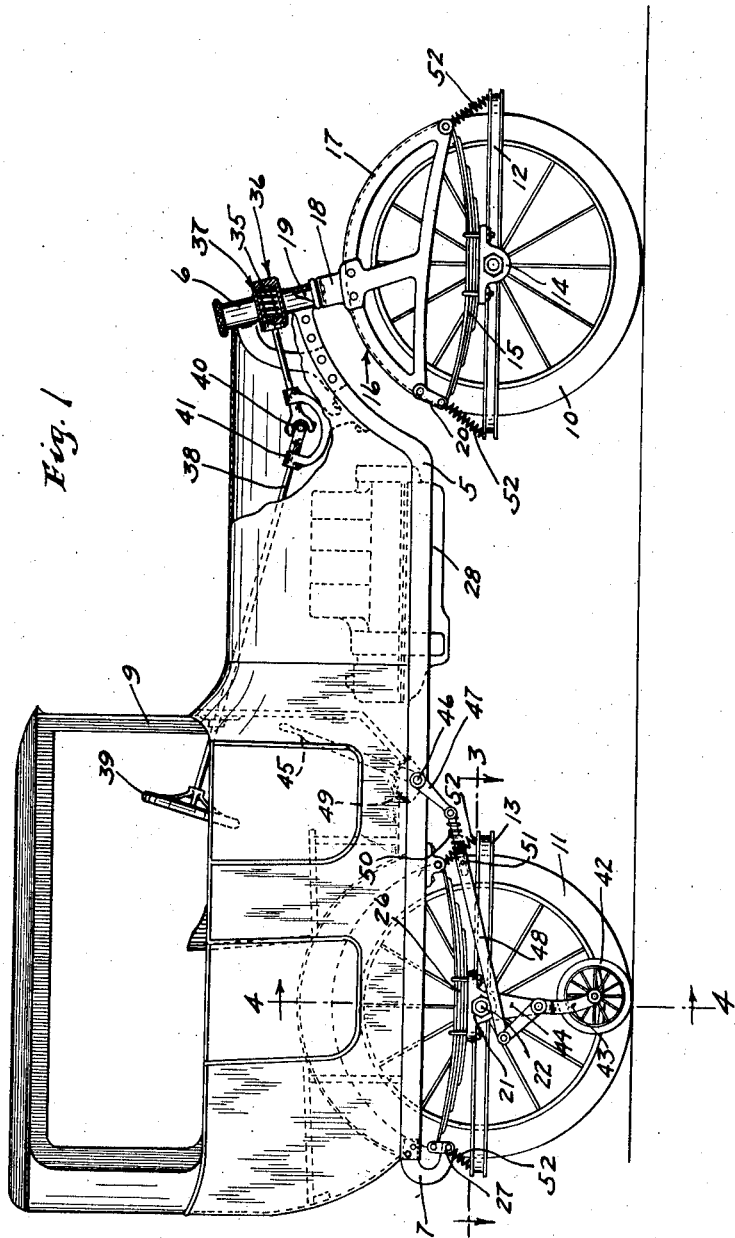
INVENTOR.
Andrew Duresen
BY HIS ATTORNEYS.

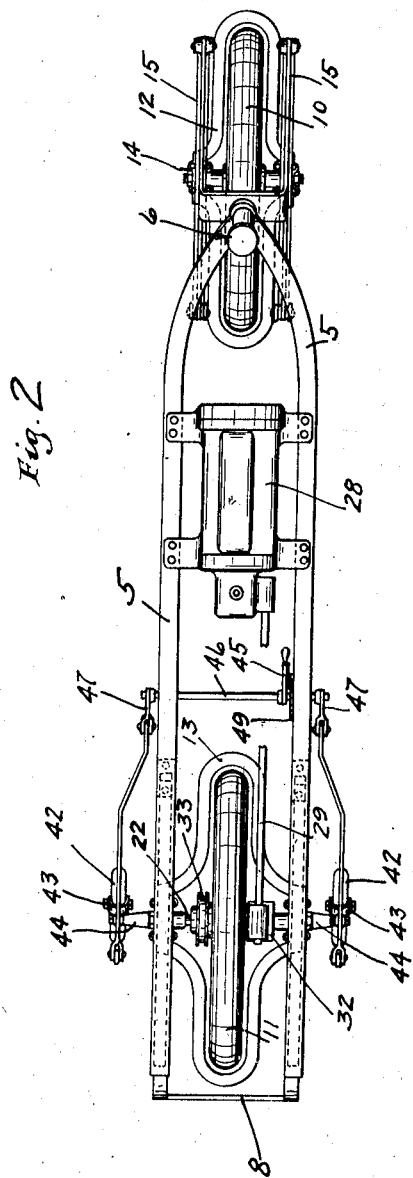

A. DURESEN.
TWO-WHEELED MOTOR VEHICLE.
APPLICATION FILED JULY 3, 1919.
1,339,554.
Patented May 11, 1920.
3 SHEETS—SHEET 3.
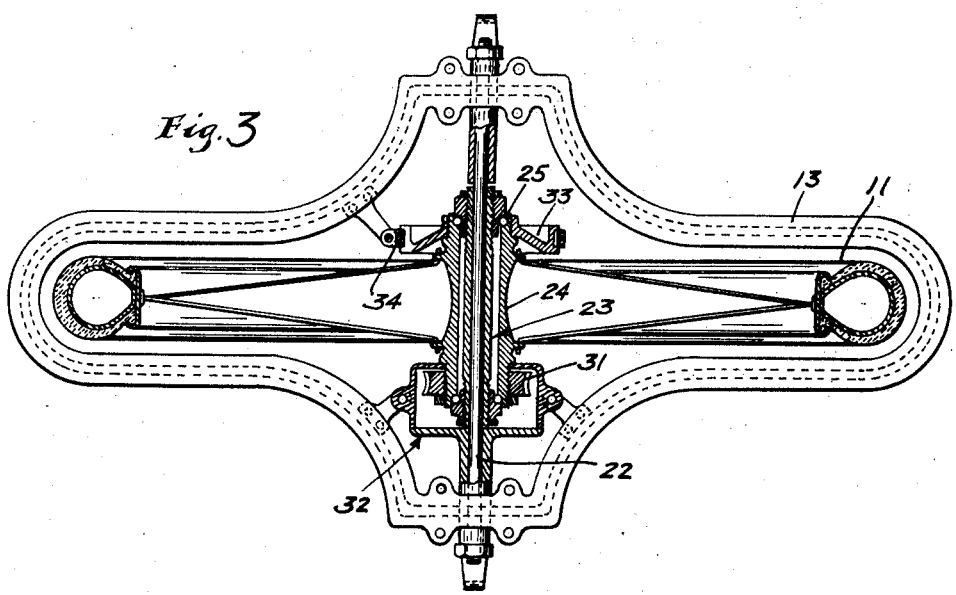
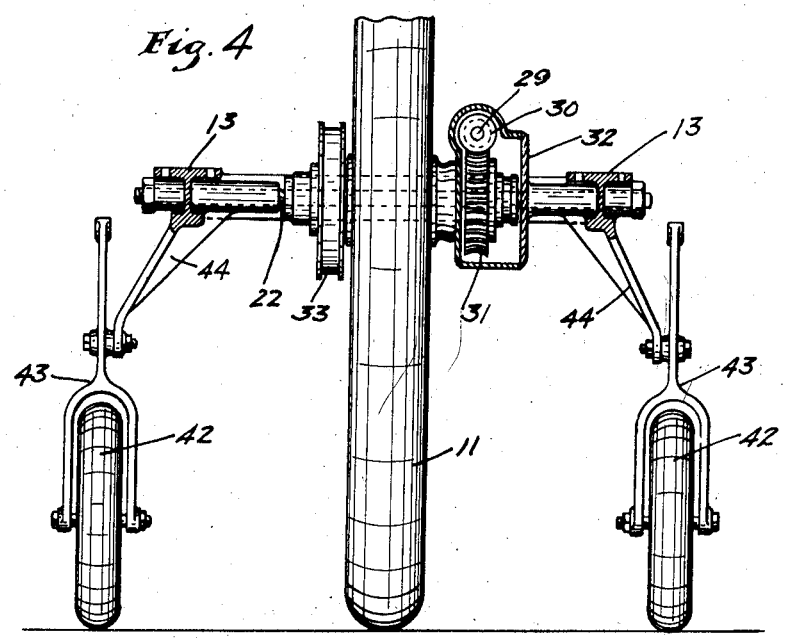
INVENTOR
Andrew Duresen
BY HIS ATTORNEYS.

UNITED STATES PATENT OFFICE.

ANDREW DURESEN, OF MINNEAPOLIS, MINNESOTA.

TWO-WHEELED MOTOR-VEHICLE.

1,339,554.  Specification of Letters Patent.  Patented May 11, 1920.

Application filed July 3, 1919. Serial No. 308,502.

*To all whom it may concern:*

Be it known that I, ANDREW DURESEN, a citizen of the United States, residing at Minneapolis, in the county of Hennepin and State of Minnesota, have invented certain new and useful Improvements in Two-Wheeled Motor-Vehicles; and I do hereby declare the following to be a full, clear, and exact description of the invention, such as will enable others skilled in the art to which it appertains to make and use the same.

My invention has for its object to provide a simple and highly efficient motor vehicle of the type having two wheels arranged in tandem, and which depend upon momentum to keep in an upright position while in motion.

To the above end, it consists of the novel devices and combinations of devices hereinafter described and defined in the claims.

In the accompanying drawings, which illustrate the invention, like characters indicate like parts throughout the several views.

Referring to the drawings:

Figure 1 is a right side elevation of the invention with some parts broken away;

Fig. 2 is a plan view of the same with the body removed;

Fig. 3 is a view principally in horizontal section taken on the line 3—3 of Fig. 1; and Fig. 4 is a view partly in rear end elevation and partly in vertical section taken on the line 4—4 of Fig. 1.

The chassis of the improved vehicle, as shown, comprises a pair of laterally spaced side sills 5, the forward end portions of which converge and are rigidly secured to a rearwardly inclined steering head 6. To the rear ends of the side sills 5 are rigidly secured depending and forwardly projecting spring supporting members 7 connected by a rear end sill 8. The body of the motor vehicle is, as shown, of the sedan type, indicated as an entirety by the numeral 9, and has front and rear single seats.

The running gear of the motor vehicle includes a front wheel 10 and a rear wheel 11 in tandem arrangement, and each of which is equipped with a pneumatic tire. Surrounding each wheel 10 and 11 is an endless rounding wheel frame 12 and horizontally disposed wheel frame 12 and 13, respectively. The front wheel 10 is journaled in bearings 14 on the sides of its frame 12, and which bearings support a pair of semi-elliptical springs 15.

The front of the motor vehicle is supported from the springs 15 by a fork 16, which comprises a pair of laterally spaced segmental members 17 intermediately connected by a fork-like member 18, having a spindle 19 journaled in the head 6. The fork side members 17 are located on opposite sides of the front wheel 10 in vertical planes directly over the springs 15 and with the fork-like member 18 extending over said wheel. The front ends of the springs 15 are pivoted to the forward ends of the side members 17, and the rear ends thereof are connected by shackles 20 to the rear end of said fork-like members.

On the sides of the rear wheel frame 13 are bearings 21, having secured therein the ends of a fixed shaft 22, which carries a sleeve 23, that projects through the hub 24 of the rear wheel 11. Roller bearings 25 are interposed between the sleeve 23 and the hub 24. The rear of the motor vehicle is supported from the wheel frame 13 by a pair of semi-elliptical springs 26, the front ends of which are pivoted to the side sills 5 and the rear ends of which are connected by shackles 27 to the lower end of the sill members 7.

The motive power of the vehicle, as shown, is an internal combustion engine indicated as an entirety by the numeral 28 and having on the rear end of its propeller shaft 29 a worm 30 which meshes with a worm gear 31 secured to the right-hand end of the hub 24. A housing 32 for the worm 30 and worm gear 31 is secured to the rear wheel frame 13. On the left-hand end of the hub of the rear wheel 11 is a brake drum 33 to which is applied a brake band 34 which may be operated in the customary or any suitable manner.

Angular steering movements are imparted to the front wheel 10 by a worm 35 journaled in a housing 36 on the head 6 and meshing with a worm gear 37 on the spindle 19. The worm 35 is secured to the front end of an operating shaft 38 equipped with a steering wheel 39 and having a universal joint 40. The adjacent ends of the shaft 38 at the universal joint 40 are journaled in a bracket 41 secured to the side sills 5.

For supporting the motor vehicle in an upright position when standing still, there is provided a pair of relatively small wheels 42 journaled in forked levers 43 intermediately pivoted to the lower end of a pair of brackets 44. These brackets 44 are integrally formed with the rear wheel frame 13 directly under the bearings 21 and diverge therefrom. To lift and hold the wheels 42 from the ground while the vehicle is in motion, there is provided a hand lever 45 secured to a rock shaft 46 journaled in the side sills 5. On the outer ends of the rock shaft 46 is a pair of downwardly and rearwardly projecting arms 47 to which the upper ends of the fork levers 43 are connected by a pair of links 48. The lever 45 is held in different adjustment by latch segment 49. The connections for raising and lowering the wheels 42 are such as to cause said wheels to swing rearward when lifting.

To permit the wheels 42 to freely pass over uneven places or obstructions in the road bed without lifting the respective side of the vehicle and without straining the operating connections therefor, the links 48 are made up of telescopically connected members held projected by coiled springs 50. The telescopical movement of each link 48 is controlled by a slot and pin connection 51.

To prevent undue vibrations of the wheel frame 12 and 13, coiled springs 52 yieldingly connect the front and rear ends of said frames to the connections for the ends of the leaf springs 15 and 26.

What I claim is:—

1. In a motor vehicle, the combination with a main frame, of a front wheel frame and a rear wheel frame, a wheel journaled in each of said wheel frames, a front wheel fork turnably connected to the main frame, pairs of leaf springs supporting said fork from the front wheel frame and the main frame from the rear wheel frame, springs connecting the ends of the leaf springs to the front and rear wheel frames and steering wheel equipped connections for imparting angular steering movement to said fork.

2. In a motor vehicle, the combination with a main frame, of a front wheel frame and a rear wheel frame, a wheel journaled in each of said wheel frames, a front wheel fork turnably connected to the main frame and including a pair of laterally spaced longitudinally extended members embracing the front wheel, the upper edges of said members being curved from one end to the other to follow the tread surface of the front wheel, and pairs of leaf springs intermediately secured to the wheel frames and attached to the ends of said members.

3. In a motor vehicle, the combination with a main frame, of front and rear endless wheel frames, a wheel journaled in each of said frames, a front wheel fork turnably connected to the main frame, pairs of leaf springs supporting said fork from the front wheel frame and the main frame from the rear wheel frame, and springs yieldingly holding the front and rear ends of the wheel frames.

In testimony whereof I affix my signature in presence of a witness.

ANDREW DURESEN.

Witness:
HARRY D. KILGORE.